US008896268B2

(12) United States Patent
Sakurai et al.

(10) Patent No.: US 8,896,268 B2
(45) Date of Patent: Nov. 25, 2014

(54) CHARGE/DISCHARGE CONTROL CIRCUIT AND BATTERY ASSEMBLY

(75) Inventors: Atsushi Sakurai, Chiba (JP); Toshiyuki Koike, Chiba (JP); Satoshi Abe, Chiba (JP)

(73) Assignee: Seiko Instruments Inc., Chiba (JP)

( * ) Notice: Subject to any disclaimer, the term of this patent is extended or adjusted under 35 U.S.C. 154(b) by 338 days.

(21) Appl. No.: 13/404,478

(22) Filed: Feb. 24, 2012

(65) Prior Publication Data

US 2012/0229945 A1 Sep. 13, 2012

(30) Foreign Application Priority Data

Mar. 13, 2011 (JP) ................................. 2011-054894
Dec. 15, 2011 (JP) ................................. 2011-274639

(51) Int. Cl.
*H02J 7/00* (2006.01)
*H02H 3/08* (2006.01)
*H02H 7/18* (2006.01)

(52) U.S. Cl.
CPC ................ *H02H 3/08* (2013.01); *H02J 7/0031* (2013.01); *H02J 7/0072* (2013.01); *H02H 7/18* (2013.01); *H02J 2007/0039* (2013.01)
USPC ............................. 320/132; 320/134; 320/135

(58) Field of Classification Search
USPC .......... 320/134, 132, 135, 149, 163; 324/433; 340/636.1, 636.21; 361/93.1, 87.84
See application file for complete search history.

(56) References Cited

U.S. PATENT DOCUMENTS

| 5,530,336 | A  | * | 6/1996  | Eguchi et al. | 320/118 |
| 6,501,248 | B2 | * | 12/2002 | Fujiwara      | 320/136 |
| 6,628,489 | B1 | * | 9/2003  | Pardoen et al.| 361/84  |
| 2001/0052759 | A1 | * | 12/2001 | Sakurai et al. | 320/134 |
| 2003/0132732 | A1 | * | 7/2003  | Thomas et al. | 320/134 |
| 2003/0141847 | A1 | * | 7/2003  | Fujiwara      | 320/134 |
| 2004/0189259 | A1 | * | 9/2004  | Miura et al.  | 320/134 |
| 2005/0077878 | A1 | * | 4/2005  | Carrier et al.| 320/134 |
| 2008/0024099 | A1 | * | 1/2008  | Oki et al.    | 323/282 |
| 2008/0310064 | A1 | * | 12/2008 | Uno           | 361/86  |

FOREIGN PATENT DOCUMENTS

JP 2009-131020 A 6/2009

* cited by examiner

*Primary Examiner* — Yalkew Fantu
(74) *Attorney, Agent, or Firm* — Brinks Gilson & Lione

(57) ABSTRACT

There is provided a charge/discharge control circuit and a battery assembly including an accurate overcurrent protecting circuit with low consumption current characteristics. The charge/discharge control circuit comprises a current protecting circuit including: a reference voltage circuit having a reference transistor for detecting overcurrent flowing through a control transistor to turn it on, and a constant current circuit; and a comparison circuit for comparing voltage on the reference voltage circuit with voltage generated by overcurrent flowing through the control transistor, wherein when no overcurrent flows, the electric current flowing through the reference voltage circuit is interrupted to reduce power consumption.

4 Claims, 11 Drawing Sheets

CHARGE/DISCHARGE CONTROL CIRCUIT AND BATTERY ASSEMBLY

RELATED APPLICATIONS

This application claims priority under 35 U.S.C. §119 to Japanese Patent Application Nos. 2011-054894 filed on Mar. 13, 2011 and 2011-274639 filed on Dec. 15, 2011, the entire contents of which are hereby incorporated by reference.

BACKGROUND OF THE INVENTION

1. Field of the Invention

The present invention relates to a charge/discharge control circuit for detecting voltage or abnormality in a secondary battery, and a battery assembly, and particularly to an overcurrent protecting circuit therefore.

2. Description of the Related Art

FIG. 9 shows a block diagram of a battery assembly including a conventional charge/discharge control circuit. The battery assembly including the conventional charge/discharge control circuit is composed of a secondary battery 101, N-ch FETs 901 and 902, a constant current circuit 903, a comparator 904, an overdischarge detecting circuit 905, an overcharge detecting circuit 906, a discharge control circuit 907, a charge control circuit 908, a discharge control FET 910, a charge control FET 911, and external terminals 155 and 156 between which a load 909 is connected. The N-ch FETs 901 and 902, the constant current circuit 903, and the comparator 904 make up a discharge overcurrent protecting circuit.

The following will describe the operation of the discharge overcurrent protecting circuit in the conventional battery assembly. It is assumed that the overcurrent detection current is denoted as Ioc, on-resistances of the N-ch FETs 901 and 902 are denoted as Ron 901 and Ron 902, and on-resistances of the discharge control FET 910 and the charge control FET 911 are denoted as Ron 910 and Ron 911. In this case, constant current Iref produced from the constant current circuit 903 is set as follows:

$$Iref = Ioc \times (Ron\ 911 + Ron\ 910) \div (Ron\ 902 + Ron\ 901),$$

where, if the N-ch FETs 901 and 902 have the same temperature characteristics and source-gate voltage characteristics as the discharge control FET 910 and the charge control FET 911, $$(Ron\ 902 + Ron\ 901) \div (Ron\ 911 + Ron\ 910) = K\ (constant).$$

Then, if constant reference current Iref is supplied from the constant current circuit 903, the overcurrent detection current Ioc can also be set to a constant magnitude.

As mentioned above, if these N-ch FETs 901 and 902, the discharge control FET 910, and the charge control FET 911 are arranged in the same semiconductor integrated circuit to equalize parameters other than those (gate width/gate length) of the charge control FET 911 and the N-ch FET 902, and the discharge control FET 910 and the N-ch FET 901, the above-mentioned conditions can be fulfilled.

Since the constant K is set to one or more (K≥1) in consideration of the consumption current in and size of the overcurrent protecting circuit, the magnitude of reference current Iref is made smaller to make the sizes of the N-ch FETs 901 and 902 smaller than those of the charge control FET 911 and the discharge control FET 910, respectively. Thus, the reference current Iref becomes Iref=Ioc÷K.

The charge control FET 911 and the discharge control FET 910 have large widths to allow a large current to flow. Therefore, if the gate widths of the N-ch FETs 901 and 902 are set to one millionth of the gate widths of the charge control FET 911 and the discharge control FET 910, respectively, a million-fold increase in on-resistance can be achieved. The sizes of the N-ch FETs 901 and 902 can also be made sufficiently smaller than those of the charge control FET 911 and the discharge control FET 910.

Thus, on-resistances Ron 911, Ron 910, and Ron 902, Ron 901 equivalent to one another in terms of the temperature characteristics and the gate drive voltage characteristics are used in the charge control FET 911, the discharge control FET 910, and the N-ch FETs 901 and 902, respectively, so that characteristic variations due to changes in temperature and battery voltage can be compensated for without fault. Then, an overcurrent state can be detected accurately by the overcurrent detecting comparator 904 (for example, see Patent Document 1).

[Patent Document 1] Japanese Patent Application Publication No. 2009-131020

SUMMARY OF THE INVENTION

However, in the conventional technique, since electric current always flows through the N-ch FETs 901 and 902, there arises a problem that the consumption current of the charge/discharge control circuit becomes large.

The present invention has been made to solve the above problem, and it is an object thereof to provide a charge/discharge control circuit and a battery assembly including an accurate overcurrent protecting circuit with low consumption current characteristics.

In order to solve the conventional problem, a charge/discharge control circuit of the present invention has the following structure: A charge/discharge control circuit for controlling a control transistor provided in a current path between a secondary battery and a load or a charger to control the charge/discharge of the secondary battery, the circuit comprising an overcurrent protecting circuit including: a first comparison circuit for comparing voltage, generated by electric current flowing through the control transistor, with a first reference voltage; a second reference voltage circuit for outputting a second reference voltage, wherein on and off of the second reference voltage circuit is controlled by output of the first comparison circuit, and the second reference voltage circuit includes a reference transistor equivalent in characteristic to the control transistor, and a constant current circuit for applying electric current to the reference transistor; and a second comparison circuit for comparing voltage, generated by the electric current flowing through the control transistor, with the second reference voltage, wherein the first reference voltage is voltage lower than the second reference voltage, and when overcurrent flows through the control transistor, the reference transistor is first turned on, and when the electric current is further increased, the control transistor is turned off.

There is also provided a battery assembly including the charge/discharge control circuit.

According to the charge/discharge control circuit including the overcurrent protecting circuit of the present invention, there can be provided a charge/discharge control circuit and a battery assembly including an accurate overcurrent protecting circuit with low consumption current characteristics.

DETAILED DESCRIPTION OF THE PREFERRED EMBODIMENTS

First Embodiment

Figure 1:
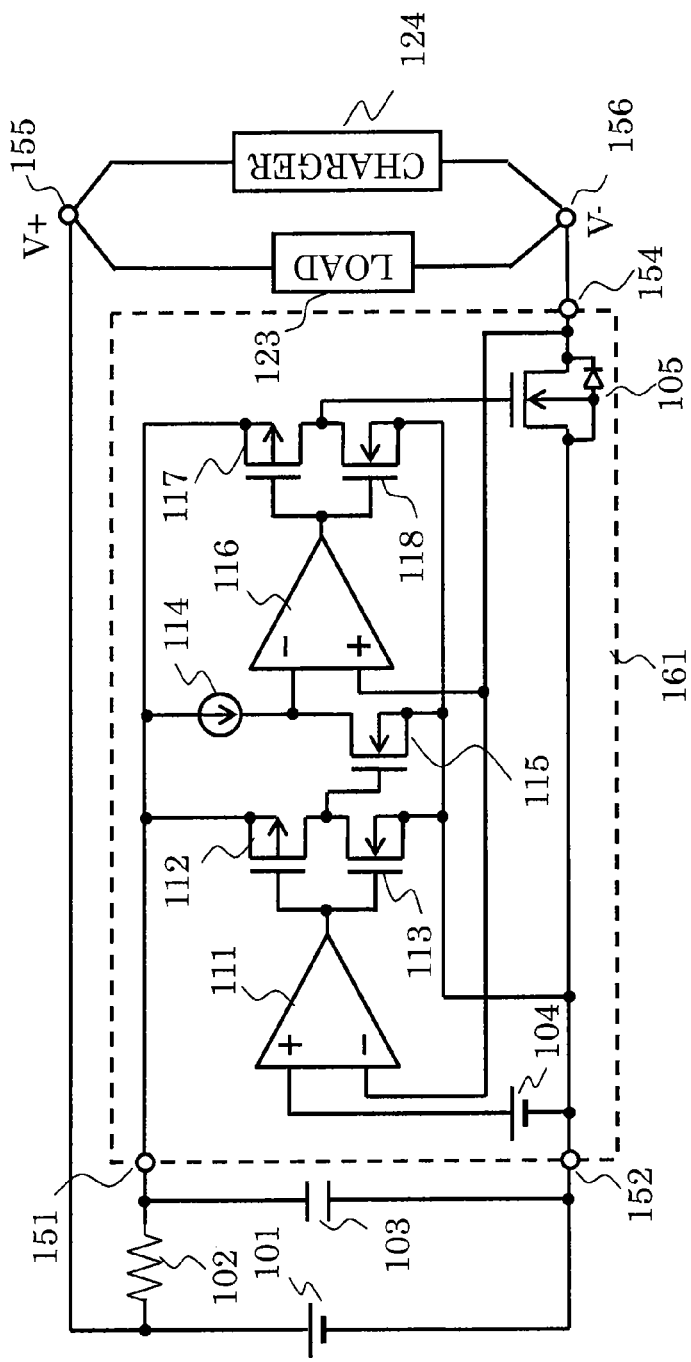
FIG. 1 is a block diagram of a battery assembly including an overcurrent protecting circuit of a first embodiment.

FIG. 1 is a block diagram of a battery assembly including an overcurrent protecting circuit of a first embodiment.

The battery assembly of the first embodiment includes a secondary battery 101, a resistor 102, a capacitor 103, external terminals 155 and 156 between which a charger 124 or a load 123 is connected, and a charge/discharge control circuit 161. The charge/discharge control circuit 161 includes a discharge overcurrent protecting circuit made up of a reference voltage circuit 104, comparators 111 and 116, N-ch FETs 113, 115, and 118, P-ch FETs 112 and 117, a constant current circuit 114, an N-ch discharge control FET 105, and terminals 151, 152, and 154. The other components such as an overdischarge detecting circuit and an overcharge detecting circuit are not shown.

The positive electrode of the secondary battery 101 is connected to the resistor 102 and the external terminal 155, and the negative electrode is connected to the capacitor 103 and the terminal 152 of the charge/discharge control circuit 161. The other terminal of the resistor 102 is connected to the other terminal of the capacitor 103 and the terminal 151 of the charge/discharge control circuit 161, and the external terminal 156 is connected to the terminal 154 of the charge/discharge control circuit 161. The non-inverting input terminal of the comparator 111 is connected to the reference voltage circuit 104, the inverting input terminal is connected to the terminal 154, and the output terminal is connected to the gate of the P-ch FET 112 and the gate of the N-ch FET 113. The other terminal of the reference voltage circuit 104 is connected to the terminal 152. The source of the P-ch FET 112 is connected to the terminal 151, and the drain is connected to the gate of the N-ch FET 115. The source of the N-ch FET 113 is connected to the terminal 152, and the drain is connected to the gate of the N-ch FET 115. The source of the N-ch FET 115 is connected to the terminal 152, and the drain is connected to the constant current circuit 114. The other terminal of the constant current circuit 114 is connected to the terminal 151. The inverting input terminal of the comparator 116 is connected to the drain of the N-ch FET 115, the non-inverting input terminal is connected to the terminal 154, and the output terminal is connected to the gate of the P-ch FET 117 and the gate of the N-ch FET 118. The source of the P-ch FET 117 is connected to the terminal 151, and the drain is connected to the gate of the N-ch discharge control FET 105. The source of the N-ch FET 118 is connected to the terminal 152, and the drain is connected to the gate of the N-ch discharge control FET 105. The source and back gate of the N-ch discharge control FET 105 are connected to the terminal 152, and the drain is connected to the terminal 154.

Next, the operation of the battery assembly of the first embodiment will be described.

When the external terminals 155 and 156 are short-circuited, electric current flows between the source and drain of the N-ch discharge control FET 105, and the on-resistance of the N-ch discharge control FET 105 makes the voltage at the inverting input terminal of the comparator 111 rise. When the voltage at the inverting input terminal of the comparator 111 exceeds the voltage on the reference voltage circuit 104, the comparator 111 outputs Lo signal. As a result, the P-ch FET 112 is turned on and the N-ch FET 113 is turned off to output Hi signal to the gate of the N-ch FET 115 so as to turn on the N-ch FET 115. When the N-ch FET 115 is turned on, electric current flows from the constant current circuit 114 and the on-resistance of the N-ch FET 115 makes the voltage at the inverting input terminal of the comparator 116 drop to maintain a constant voltage. Then, when the electric current continues to flow between the source and drain of the N-ch discharge control FET 105 to make the voltage at the non-inverting input terminal of the comparator 116 exceed the voltage at its inverting input terminal, the comparator 116 outputs Hi signal. As a result, the P-ch FET 117 is turned off and the N-ch FET 118 is turned on to output Lo signal to the gate of the N-ch discharge control FET 105 so as to turn off the N-ch discharge control FET 105. Thus, when the external terminals 155 and 156 are short-circuited, overcurrent protection can be imposed.

The voltage on the reference voltage circuit 104 is set lower than the voltage at the inverting input terminal of the comparator 116 generated when a set current flows to impose overcurrent protection. In such a structure, since the N-ch FET 115 is turned on before reaching the set current for imposing overcurrent protection, overcurrent protection can be imposed when the current exceeds the set current. Then, under normal conditions, since the N-ch FET 115 is off, the consumption current of the overcurrent protecting circuit can be made small.

The on-resistance Ron 105 of the N-ch discharge control FET 105 and the on-resistance Ron 115 of the N-ch FET 115 are set to satisfy the following: Ron 105÷Ron 115=N (constant). If the overcurrent detection current is denoted as Ioc and the electric current in the constant current circuit 114 is denoted as Iref, it is set to satisfy the following: Iref=Ioc×Ron 105÷Ron 115. The value of Ioc can be set by adjusting the current value of Iref and the temperature characteristics, the on-resistance of the N-ch FET 115 and the temperature characteristics, and the gate-source voltage characteristics. For example, an FET having temperature characteristics and gate-source voltage characteristics similar to those of the N-ch discharge control FET 105 has just to be used for the N-ch FET 115.

Though not shown, the output of the comparator 111 may be connected directly to the gate of the N-ch FET 115 to perform control.

As described above, according to the battery assembly including the overcurrent protecting circuit of the first embodiment, the N-ch FET 115 is turned off when overcurrent protection is not imposed, enabling reduction in consumption current.

Second Embodiment

Figure 2:
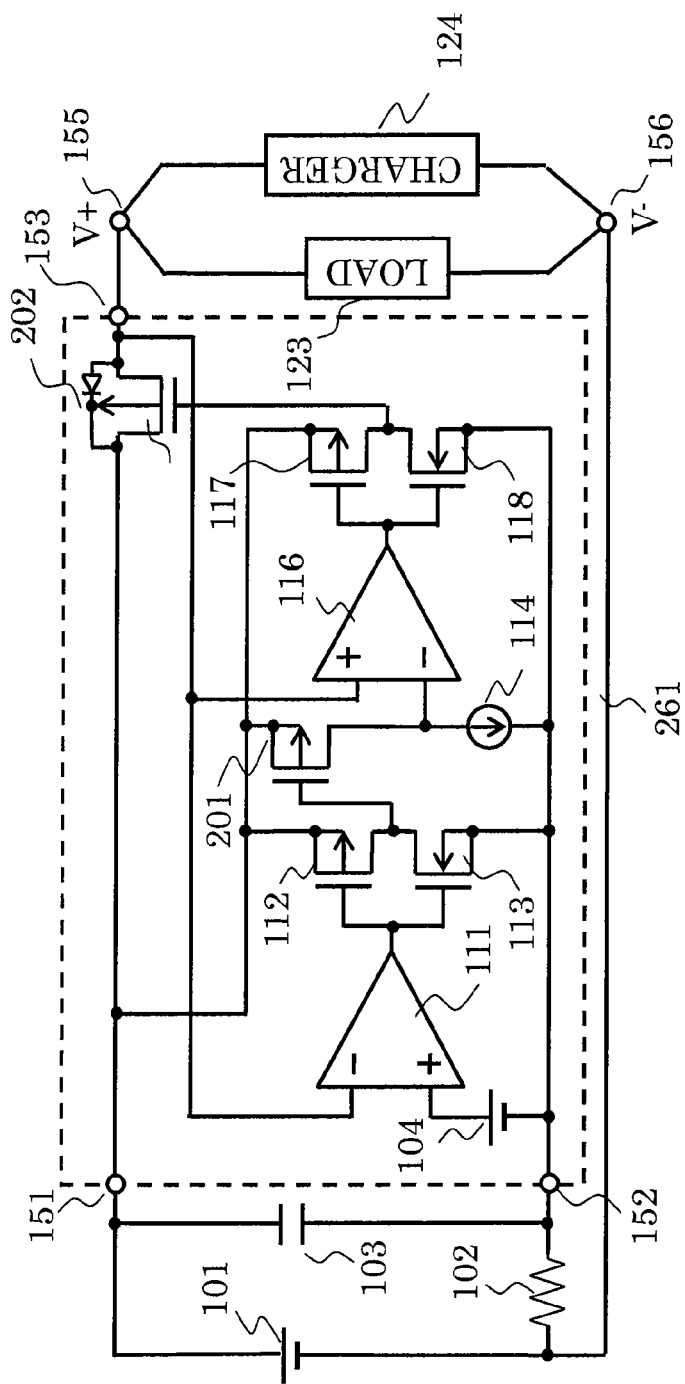
FIG. 2 is a block diagram of a battery assembly including an overcurrent protecting circuit of a second embodiment.

FIG. 2 is a block diagram of a battery assembly including an overcurrent protecting circuit of a second embodiment. The second embodiment differs from the battery assembly in FIG. 1 in that the discharge control FET is changed to a P-ch discharge control FET 202. Along with this, the logic of the discharge overcurrent protecting circuit is changed.

The negative electrode of the secondary battery 101 is connected to the resistor 102 and the external terminal 156, and the positive electrode is connected to the capacitor 103 and the terminal 151 of a charge/discharge control circuit 261. The other terminal of the resistor 102 is connected to the other terminal of the capacitor 103 and the terminal 152 of the charge/discharge control circuit 261, and the external terminal 155 is connected to a terminal 153 of the charge/discharge control circuit 261. The non-inverting input terminal of the comparator 111 is connected to the reference voltage circuit 104, the inverting input terminal is connected to the terminal 153, and the output terminal is connected to the gate of the P-ch FET 112 and the gate of the N-ch FET 113. The other terminal of the reference voltage circuit 104 is connected to the terminal 152. The source of the P-ch FET 112 is connected to the terminal 151, and the drain is connected to the gate of a P-ch FET 201. The source of the N-ch FET 113 is connected to the terminal 152, and the drain is connected to the gate of the P-ch FET 201. The source of the P-ch FET 201 is connected to the terminal 151, and the drain is connected to the constant current circuit 114. The other terminal of the constant current circuit 114 is connected to the terminal 152. The inverting input terminal of the comparator 116 is connected to the drain of the P-ch FET 201, the non-inverting input terminal is connected to the terminal 153, and the output terminal is connected to the gate of the P-ch FET 117 and the gate of the N-ch FET 118. The source of the P-ch FET 117 is connected to the terminal 151, and the drain is connected to the gate of the P-ch discharge control FET 202. The source of the N-ch FET 118 is connected to the terminal 152, and the drain is connected to the gate of the P-ch discharge control FET 202. The source and back gate of the P-ch discharge control FET 202 are connected to the terminal 151, and the drain is connected to the terminal 153.

Next, the operation of the battery assembly of the second embodiment will be described.

When the external terminals 155 and 156 are short-circuited, electric current flows between the source and drain of the P-ch discharge control FET 202, and the on-resistance of the P-ch discharge control FET 202 makes the voltage at the inverting input terminal of the comparator 111 drop. When the voltage at the inverting input terminal of the comparator 111 falls below the voltage on the reference voltage circuit 104, the comparator 111 outputs Hi signal. As a result, the P-ch FET 112 is turned off and the N-ch FET 113 is turned on to output Lo signal to the gate of the P-ch FET 201 so as to turn on the P-ch FET 201. When the P-ch FET 201 is turned on, electric current flows from the constant current circuit 114 and the on-resistance of the P-ch FET 201 makes the voltage at the inverting input terminal of the comparator 116 rise to maintain a constant voltage. When the electric current continues to flow between the source and drain of the P-ch discharge control FET 202 to make the voltage at the non-inverting input terminal of the comparator 116 falls below the voltage at its inverting input terminal, the comparator 116 outputs Lo signal. As a result, the P-ch FET 117 is turned on and the N-ch FET 118 is turned off to output Hi signal to the gate of the P-ch discharge control FET 202. Thus, when the external terminals 155 and 156 are short-circuited, overcurrent protection can be imposed.

The voltage on the reference voltage circuit 104 is set higher than the voltage at the inverting input terminal of the comparator 116 generated when a set current flows to impose overcurrent protection. Thus, the P-ch FET 201 is turned on before reaching the set current for imposing overcurrent protection, enabling overcurrent protection. Further, since the P-ch FET 201 is turned off until reaching the set current, the consumption current without overcurrent protection can be reduced.

The on-resistance Ron 202 of the P-ch discharge control FET 202 and the on-resistance Ron 201 of the P-ch FET 201 are set to satisfy the following: Ron 202÷Ron 201=N (constant). If the overcurrent detection current is denoted as Ioc and the current in the constant current circuit 114 is denoted as Iref, it is set to satisfy the following: Iref=Ioc×Ron 202÷Ron 201. Ioc can be set by adjusting the current value of Iref and the temperature characteristics, the on-resistance of the P-ch FET 201 and the temperature characteristics, and the gate-source voltage characteristics. For example, an FET having temperature characteristics and gate-source voltage characteristics similar to those of the P-ch discharge control FET 202 has just to be used for the P-ch FET 201.

Though not shown, the output of the comparator 111 may be connected directly to the gate of the P-ch FET 201 to perform control.

As described above, according to the battery assembly including the overcurrent protecting circuit of the second embodiment, the P-ch FET 201 is turned off when overcurrent protection is not imposed, enabling reduction in consumption current.

Third Embodiment

Figure 3:
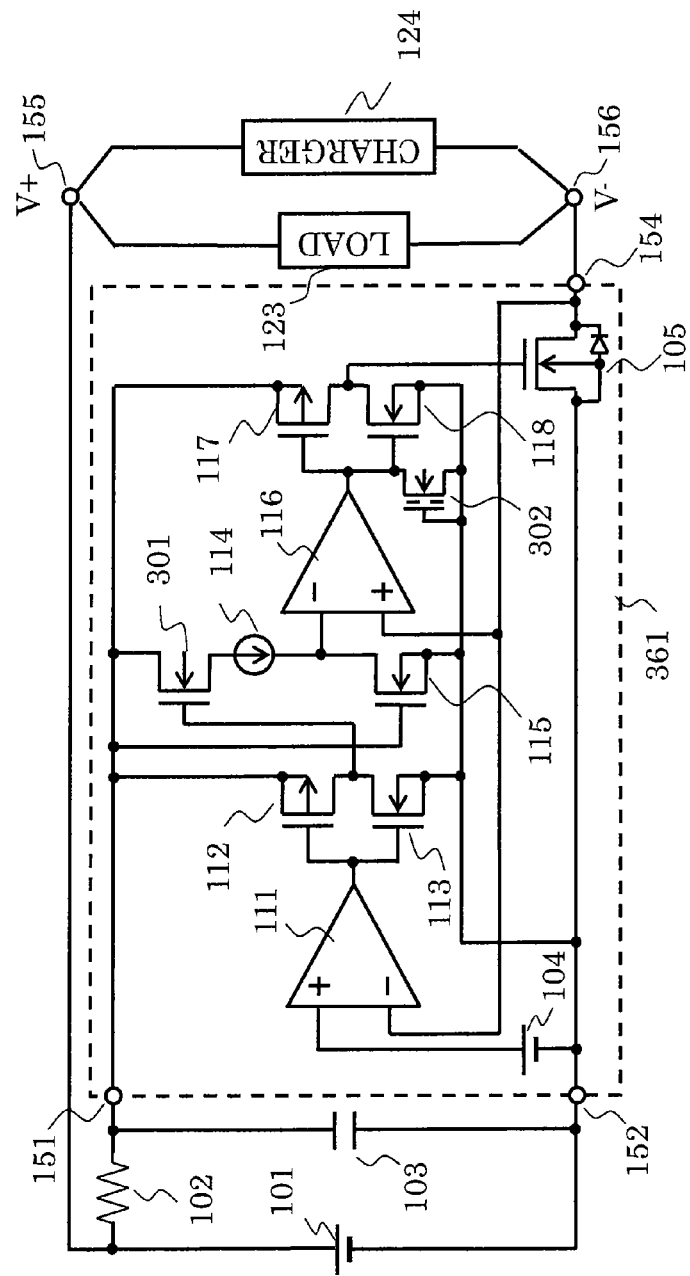
FIG. 3 is a block diagram of a battery assembly including an overcurrent protecting circuit of a third embodiment.

FIG. 3 is a block diagram of a battery assembly including an overcurrent protecting circuit of a third embodiment. Points different from FIG. 1 are that an N-ch FET 301 and an N-ch depression FET 302 are added to change the connection between the N-ch FET 115 and an overcurrent protecting circuit 361.

The gate of the N-ch FET 301 is connected to the drain of the P-ch FET 112 and the drain of the N-ch FET 113, the drain is connected to the terminal 151, and the source is connected to the constant current circuit 114. The gate of the N-ch FET 115 is connected to the terminal 151, the drain is connected the inverting input terminal of the comparator 116 and the other terminal of the constant current circuit 114, and the source is connected to the terminal 152. The drain of the N-ch depression FET 302 is connected to the output of the comparator 116, and the gate and source are connected to the terminal 152.

Next, the operation of the battery assembly including the overcurrent protecting circuit of the third embodiment will be described. When the external terminals 155 and 156 are short-circuited, electric current flows between the source and drain of the N-ch discharge control FET 105, and the on-resistance of the N-ch discharge control FET 105 makes the voltage at the inverting input terminal of the comparator 111 rise. When the voltage at the inverting input terminal of the comparator 111 exceeds the voltage on the reference voltage circuit 104, the comparator 111 outputs Lo signal. As a result, the P-ch FET 112 is turned on and the N-ch FET 113 is turned off to output Hi signal to the gate of the N-ch FET 301 so as to turn on the N-ch FET 301. The N-ch FET 115 is always on. When the N-ch FET 301 is turned on, electric current flows from the constant current circuit 114 and the on-resistance of the N-ch FET 115 makes the voltage at the inverting input terminal of the comparator 116 rise to maintain a constant voltage. When the electric current continues to flow between the source and drain of the N-ch discharge control FET 105 to make the voltage at the non-inverting input terminal of the comparator 116 exceed the voltage at its inverting input terminal, the comparator 116 outputs Hi signal. As a result, the P-ch FET 117 is turned off and the N-ch FET 118 is turned on to output Lo signal to the gate of the N-ch discharge control FET 105 so as to turn off the N-ch discharge control FET 105. Thus, when the external terminals 155 and 156 are short-circuited, overcurrent protection can be imposed.

The voltage on the reference voltage circuit 104 is set lower than the voltage at the inverting input terminal of the comparator 116 generated when a set current flows to impose overcurrent protection. Thus, the N-ch FET 301 is turned on before reaching the set current for imposing overcurrent protection, enabling overcurrent protection. Further, since the N-ch FET 301 is turned off until reaching the set current, the consumption current without overcurrent protection can be reduced.

The on-resistance Ron 105 of the N-ch discharge control FET 105 and the on-resistance Ron 115 of the N-ch FET 115 are set to satisfy the following: Ron 105÷Ron 115=N (constant). If the overcurrent detection current is denoted as Ioc and the current in the constant current circuit 114 is denoted as Iref, it is set to satisfy the following: Iref=Ioc×Ron 105÷Ron 115. Ioc can be set by adjusting the current value of Iref and the temperature characteristics, the on-resistance of the N-ch FET 115 and the temperature characteristics, and the gate-source voltage characteristics. For example, an FET having temperature characteristics and gate-source voltage characteristics similar to those of the N-ch discharge control FET 105 has just to be used for the N-ch FET 115.

The electric current flowing through the N-ch FET 115 is switched on/off through the N-ch FET 301, and this can make it easy to adjust the N-ch FET 115.

The N-ch depression FET 302 pulls down the output of the comparator 116 when the external terminals 155 and 156 are not short-circuited and the N-ch FET 301 is off, preventing the output from becoming inconstant.

Though not shown, the output of the comparator 111 may be connected directly to the gate of the N-ch FET 301 to perform control.

As described above, according to the battery assembly including the overcurrent protecting circuit of the third embodiment, the N-ch FET 301 is turned off when overcurrent protection is not imposed, enabling reduction in consumption current. Further, the electric current flowing through the N-ch FET 115 is switched on/off through the N-ch FET 301, and this can make it easy to adjust the N-ch FET 115.

Fourth Embodiment

Figure 4:
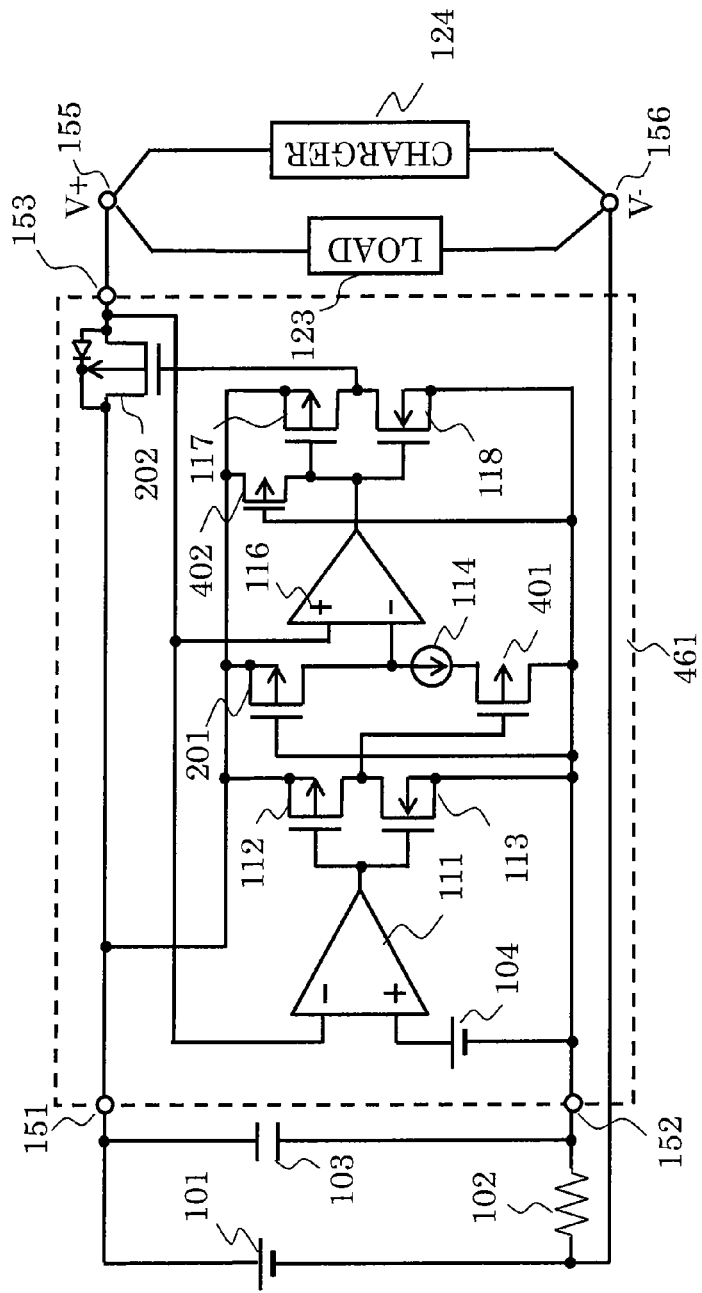
FIG. 4 is a block diagram of a battery assembly including an overcurrent protecting circuit of a fourth embodiment.

FIG. 4 is a block diagram of a battery assembly including an overcurrent protecting circuit of a fourth embodiment. Points different from FIG. 2 are that P-ch FETs 401 and 402 are added to change the connection between the P-ch FET 201 and an overcurrent protecting circuit 461.

The gate of the P-ch FET 401 is connected to the drain of the P-ch FET 112 and the drain of the N-ch FET 113, the drain is connected to the terminal 152, and the source is connected to the constant current circuit 114. The gate of the P-ch FET 201 is connected to the terminal 152, the drain is connected to the inverting input terminal of the comparator 116 and the other terminal of the constant current circuit 114, and the source is connected to the terminal 151. The gate of the P-ch FET 402 is connected to the terminal 152, the drain is connected to the output of the comparator 116, and the source is connected to the terminal 151.

Next, the operation of the battery assembly including the overcurrent protecting circuit of the fourth embodiment will be described. When the external terminals 155 and 156 are short-circuited, electric current flows between the source and drain of the P-ch discharge control FET 202, and the on-resistance of the P-ch discharge control FET 202 makes the voltage at the inverting input terminal of the comparator 111 drop. When the voltage at the inverting input terminal of the comparator 111 falls below the voltage on the reference voltage circuit 104, the comparator 111 outputs Hi signal. As a result, the P-ch FET 112 is turned off and the N-ch FET 113 is turned on to output Lo signal to the gate of the P-ch FET 401 so as to turn on the P-ch FET 401. When the P-ch FET 401 is turned on, electric current flows from the constant current circuit 114 and the on-resistance of the P-ch FET 201 makes the voltage at the inverting input terminal of the comparator 116 drop to maintain a constant voltage. When the electric current continues to flow between the source and drain of the P-ch discharge control FET 202 to make the voltage at the non-inverting input terminal of the comparator 116 fall below the voltage at its inverting input terminal, the comparator 116 outputs Lo signal. As a result, the P-ch FET 117 is turned on and the N-ch FET 118 is turned off to output Hi signal to the gate of the P-ch discharge control FET 202 so as to turn off the P-ch discharge control FET 202. Thus, when the external terminals 155 and 156 are short-circuited, overcurrent protection can be imposed.

The voltage on the reference voltage circuit 104 is set higher than the voltage at the inverting input terminal of the comparator 116 generated when a set current flows to impose overcurrent protection. Thus, the P-ch FET 401 is turned on before reaching the set current for imposing overcurrent protection, enabling overcurrent protection. Further, since the P-ch FET 401 is turned off until reaching the set current, the consumption current without overcurrent protection can be reduced.

The on-resistance Ron 202 of the P-ch discharge control FET 202 and the on-resistance Ron 201 of the P-ch FET 201 are set to satisfy the following: Ron 202÷Ron 201=N (constant). If the overcurrent detection current is denoted as Ioc and the current in the constant current circuit 114 is denoted as Iref, it is set to satisfy the following: Iref=Ioc×Ron 202÷Ron 201. Ioc can be set by adjusting the current value of Iref and the temperature characteristics, the on-resistance of the P-ch FET 201 and the temperature characteristics, and the gate-source voltage characteristics. For example, an FET having temperature characteristics and gate-source voltage characteristics similar to those of the P-ch discharge control FET 202 has just to be used for the P-ch FET 201.

The electric current flowing through the P-ch FET 201 is switched on/off through the P-ch FET 401, and this can make it easy to adjust the P-ch FET 201.

The P-ch FET 402 pulls up the output of the comparator 116 when the external terminals 155 and 156 are not short-circuited and the N-ch FET 301 is off, preventing the output from becoming inconstant.

Though not shown, the output of the comparator 111 may be connected directly to the gate of the P-ch FET 401 to perform control.

As described above, according to the battery assembly including the overcurrent protecting circuit of the fourth embodiment, the P-ch FET 401 is turned off when overcurrent protection is not imposed, enabling reduction in consumption current. Further, the electric current flowing through the P-ch FET 201 is switched on/off through the P-ch FET 401, and this can make it easy to adjust the P-ch FET 201.

Fifth Embodiment

Figure 5:
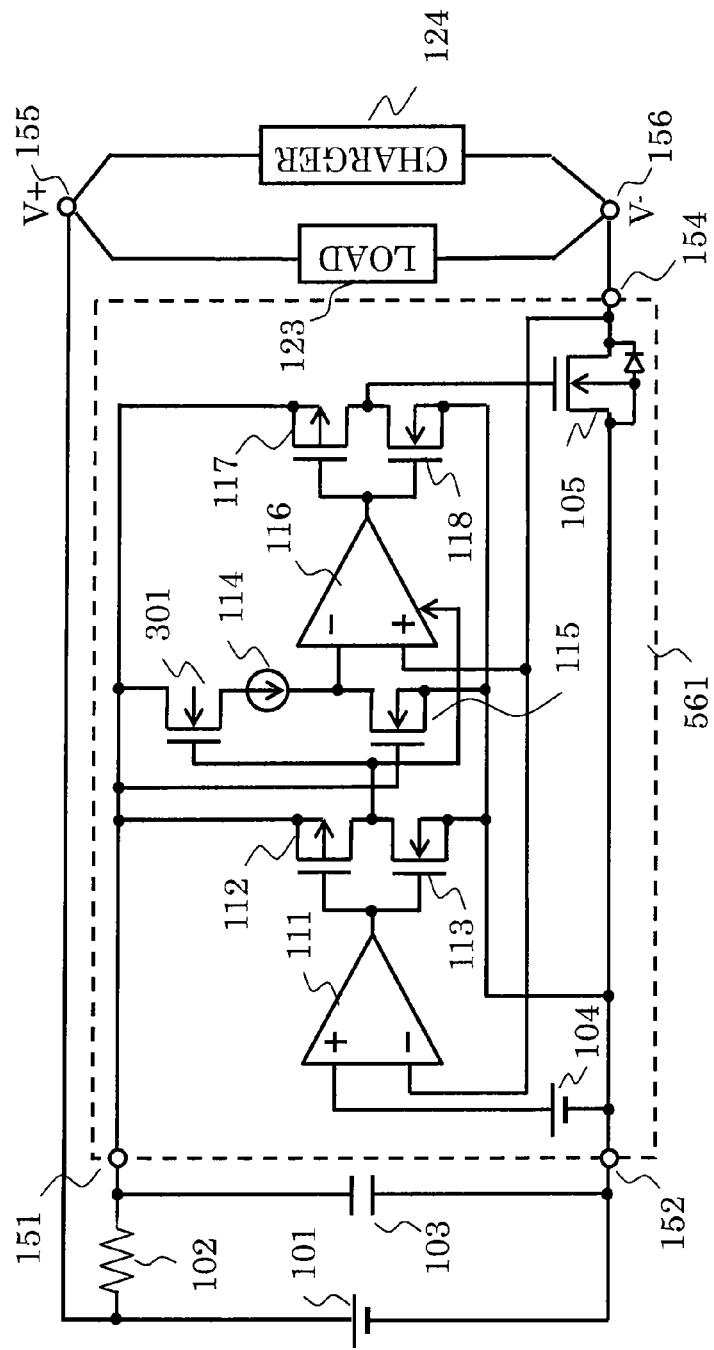
FIG. 5 is a block diagram of a battery assembly including an overcurrent protecting circuit of a fifth embodiment.

FIG. 5 is a block diagram of a battery assembly including an overcurrent protecting circuit of a fifth embodiment. A point different from FIG. 3 is that the connection of an overcurrent protecting circuit 561 is changed to control on/off of the comparator 116 using output signals from the drain of the N-ch FET 113 and the drain of the P-ch FET 112.

Next, the operation of the battery assembly including the overcurrent protecting circuit of the fifth embodiment will be described. When the external terminals 155 and 156 are short-circuited, electric current flows between the source and drain of the N-ch discharge control FET 105, and the on-resistance of the N-ch discharge control FET 105 makes the voltage at the inverting input terminal of the comparator 111 rise. When the voltage at the inverting input terminal of the comparator 111 exceeds the voltage on the reference voltage circuit 104, the comparator 111 outputs Lo signal. As a result, the P-ch FET 112 is turned on and the N-ch FET 113 is turned off to output Hi signal to the gate of the N-ch FET 301 so as to turn on the N-ch FET 301 and the comparator 116. The N-ch FET 115 is always on. When the N-ch FET 301 is turned on, electric current flows from the constant current circuit 114 and the on-resistance of the N-ch FET 115 makes the voltage at the inverting input terminal of the comparator 116 rise to maintain a constant voltage. When the electric current continues to flow between the source and drain of the N-ch discharge control FET 105 to make the voltage at the non-inverting input terminal of the comparator 116 exceed the voltage at its inverting input terminal, the comparator 116 outputs Hi signal. As a result, the P-ch FET 117 is turned off and the N-ch FET 118 is turned on to output Lo signal to the gate of the N-ch discharge control FET 105 so as to turn off the N-ch discharge control FET 105. Thus, when the external terminals 155 and 156 are short-circuited, overcurrent protection can be imposed.

The voltage on the reference voltage circuit 104 is set lower than the voltage at the inverting input terminal of the comparator 116 generated when a set current flows to impose overcurrent protection. Thus, the N-ch FET 301 and the comparator 116 are turned on before reaching the set current for imposing overcurrent protection, enabling overcurrent protection. Further, since the N-ch FET 301 and the comparator 116 are turned off until reaching the set current, the consumption current without overcurrent protection can be reduced.

The on-resistance Ron 105 of the N-ch discharge control FET 105 and the on-resistance Ron 115 of the N-ch FET 115 are set to satisfy the following: Ron 105÷Ron 115=N (constant). If the overcurrent detection current is denoted as Ioc and the current in the constant current circuit 114 is denoted as Iref, it is set to satisfy the following: Iref=Ioc×Ron 105÷Ron 115. Ioc can be set by adjusting the current value of Iref and the temperature characteristics, the on-resistance of the N-ch FET 115 and the temperature characteristics, and the gate-source voltage characteristics. For example, an FET having temperature characteristics and gate-source voltage characteristics similar to those of the N-ch discharge control FET 105 has just to be used for the N-ch FET 115.

The electric current flowing through the N-ch FET 115 is switched on/off through the N-ch FET 301, and this can make it easy to adjust the N-ch FET 115.

It would be better to pull down the output of the comparator 116 when the comparator 116 is off in order to prevent the output of the comparator 116 from becoming inconstant. Further, though not shown, the output of the comparator 111 may be connected directly to the gate of the N-ch FET 301 to perform control.

As described above, according to the battery assembly including the overcurrent protecting circuit of the fifth embodiment, the N-ch FET 301 and the comparator 116 are turned off when overcurrent protection is not imposed, enabling reduction in consumption current. Further, the electric current flowing through the N-ch FET 115 is switched on/off through the N-ch FET 301, and this can make it easy to adjust the N-ch FET 115.

Sixth Embodiment

Figure 6:
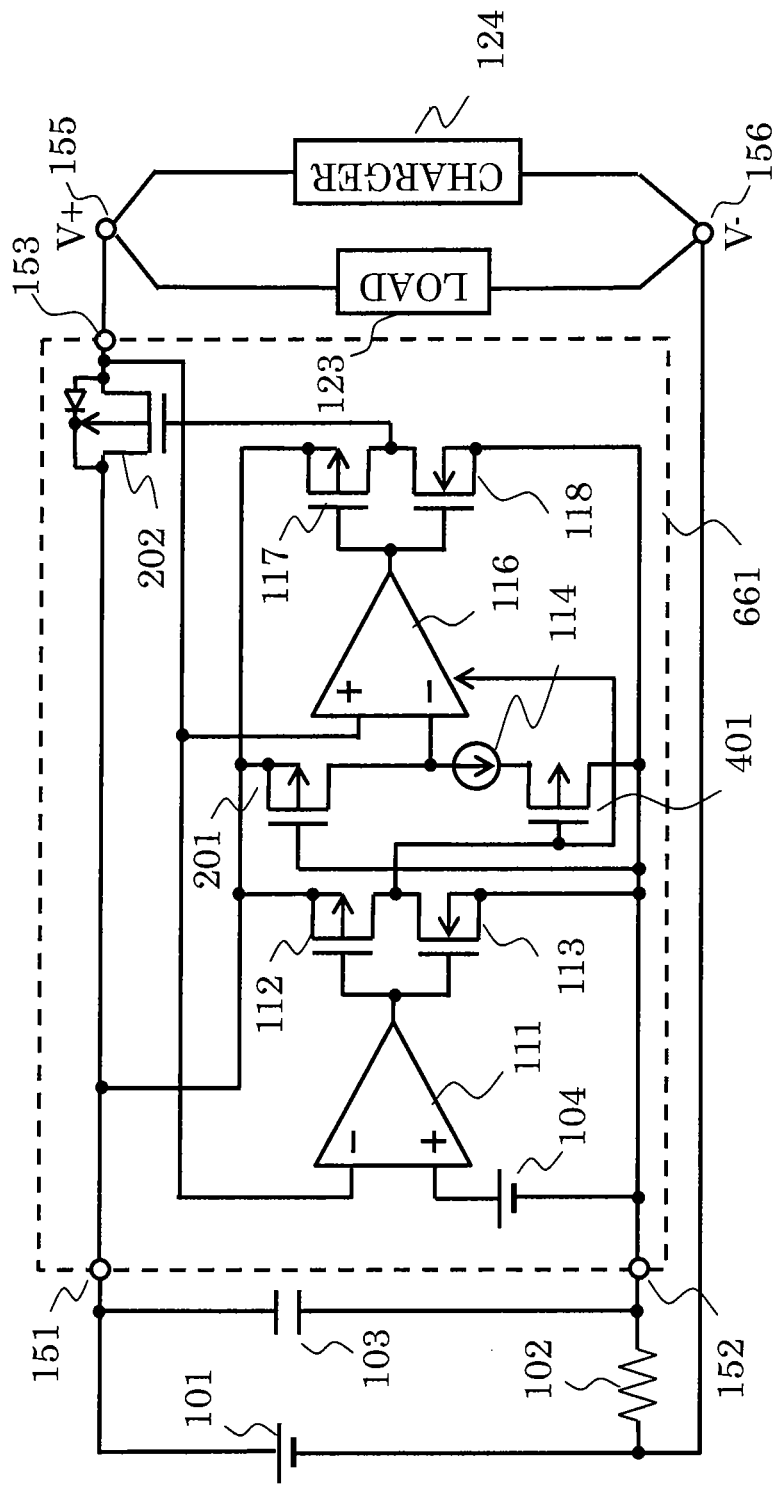
FIG. 6 is a block diagram of a battery assembly including an overcurrent protecting circuit of a sixth embodiment.

FIG. 6 is a block diagram of a battery assembly including an overcurrent protecting circuit of a sixth embodiment. A point different from FIG. 4 is that the connection of an overcurrent protecting circuit 661 is changed to control on/off of the comparator 116 using output signals from the drain of the N-ch FET 113 and the drain of the P-ch FET 112.

Next, the operation of the battery assembly including the overcurrent protecting circuit of the sixth embodiment will be described. When the external terminals 155 and 156 are short-circuited, electric current flows between the source and drain of the P-ch discharge control FET 202, and the on-resistance of the P-ch discharge control FET 202 makes the voltage at the inverting input terminal of the comparator 111 drop. When the voltage at the inverting input terminal of the comparator 111 falls below the voltage on the reference voltage circuit 104, the comparator 111 outputs Hi signal. As a result, the P-ch FET 112 is turned off and the N-ch FET 113 is turned on to output Lo signal to the gate of the P-ch FET 401 so as to turn on the P-ch FET 401 and the comparator 116. When the P-ch FET 401 is turned on, electric current flows from the constant current circuit 114 and the on-resistance of the P-ch FET 201 makes the voltage at the inverting input terminal of the comparator 116 drop to maintain a constant voltage. When the electric current continues to flow between the source and drain of the P-ch discharge control FET 202 to make the voltage at the non-inverting input terminal of the comparator 116 fall below the voltage at its inverting input terminal, the comparator 116 outputs Lo signal. As a result, the P-ch FET 117 is turned on and the N-ch FET 118 is turned off to output Hi signal to the gate of the P-ch discharge control FET 202 so as to turn off the P-ch discharge control FET 202. Thus, when the external terminals 155 and 156 are short-circuited, overcurrent protection can be imposed.

The voltage on the reference voltage circuit 104 is set higher than the voltage at the inverting input terminal of the comparator 116 generated when a set current flows to impose overcurrent protection. Thus, the P-ch FET 401 and the comparator 116 are turned on before reaching the set current for imposing overcurrent protection, enabling overcurrent protection. Further, since the P-ch FET 401 and the comparator 116 are turned off until reaching the set current, the consumption current without overcurrent protection can be further reduced.

The on-resistance Ron 202 of the P-ch discharge control FET 202 and the on-resistance Ron 201 of the P-ch FET 201 are set to satisfy the following: Ron 202÷Ron 201=N (constant). If the overcurrent detection current is denoted as Ioc and the current in the constant current circuit 114 is denoted as Iref, it is set to satisfy the following: Iref=Ioc×Ron 202÷Ron 201. Ioc can be set by adjusting the current value of Iref and the temperature characteristics, the on-resistance of the P-ch FET 201 and the temperature characteristics, and the gate-source voltage characteristics. For example, an FET having temperature characteristics and gate-source voltage characteristics similar to those of the P-ch discharge control FET 202 has just to be used for the P-ch FET 201.

The electric current flowing through the P-ch FET 201 is switched on/off through the P-ch FET 401, and this can make it easy to adjust the P-ch FET 115.

It would be better to pull up the output of the comparator 116 when the comparator 116 is off in order to prevent the output of the comparator 116 from becoming inconstant. Further, though not shown, the output of the comparator 111 may be connected directly to the gate of the P-ch FET 401 to perform control.

As described above, according to the battery assembly including the overcurrent protecting circuit of the sixth embodiment, the P-ch FET 401 and the comparator 116 are turned off when overcurrent protection is not imposed, enabling reduction in consumption current. Further, the electric current flowing through the P-ch FET 201 is switched on/off through the P-ch FET 401, and this can make it easy to adjust the P-ch FET 201.

Seventh Embodiment

Figure 7:
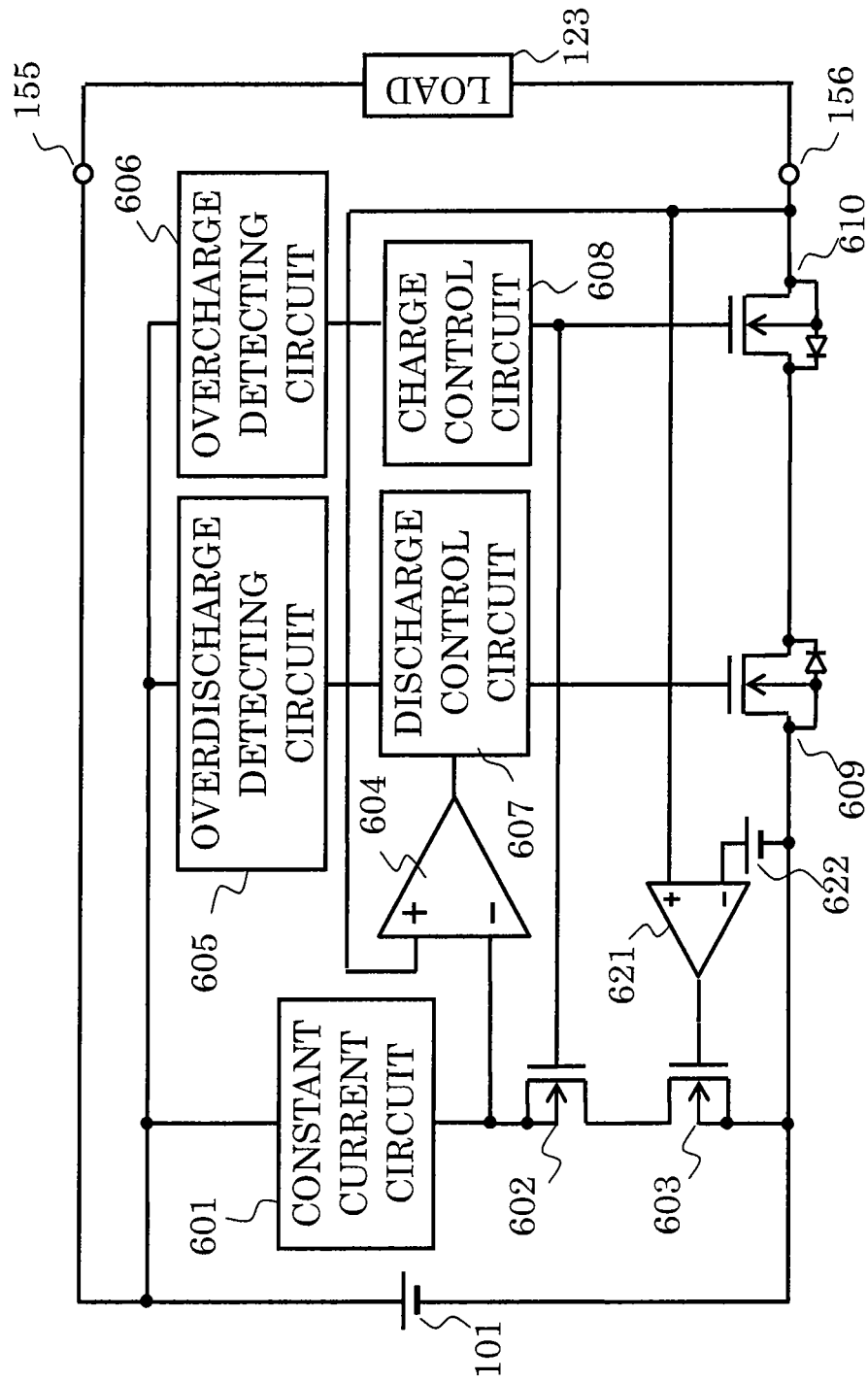
FIG. 7 is a block diagram of a battery assembly including an overcurrent protecting circuit of a seventh embodiment.

FIG. 7 is a block diagram of a battery assembly including an overcurrent protecting circuit of a seventh embodiment. The battery assembly of the seventh embodiment includes a secondary battery 101, a constant current circuit 601, N-ch FETs 602 and 603, comparators 604 and 621, an overdischarge detecting circuit 605, an overcharge detecting circuit 606, a discharge control circuit 607, a charge control circuit 608, an N-ch discharge control FET 609, an N-ch charge control FET 610, a reference voltage circuit 622, and external terminals 155 and 156.

The positive electrode of the secondary battery 101 is connected to the constant current circuit 601, the overdischarge detecting circuit 605, the overcharge detecting circuit 606, and the external terminal 155, and the negative electrode is connected to the source and back gate of the N-ch FET 603 and the source and back gate of the N-ch discharge control FET 609. The other terminal of the constant current circuit 601 is connected to the source of the N-ch FET 602, the other terminal of the overdischarge detecting circuit 605 is connected to the discharge control circuit 607, and the other terminal of the overcharge detecting circuit 606 is connected to the charge control circuit 608. The inverting input terminal of the comparator 604 is connected to the source and back gate of the N-ch FET 602, the non-inverting input terminal is connected to the external terminal 156, and the output terminal is connected to the discharge control circuit 607. The gate of the N-ch FET 602 is connected to the charge control circuit 608 and the gate of the N-ch charge control FET 610, and the drain is connected to the drain of the N-ch FET 603. The inverting input terminal of the comparator 621 is connected to the reference voltage circuit 622, the non-inverting input terminal is connected to the external terminal 156 and the source of the N-ch charge control FET 610, and the output terminal is connected to the gate of the N-ch FET 603. The gate of the N-ch discharge control FET 609 is connected to the discharge control circuit 607, the drain is connected to the drain of the N-ch charge control FET 610, and the source is connected to the other terminal of the reference voltage circuit 622.

Next, the operation of the battery assembly including the overcurrent protecting circuit of the seventh embodiment will be described. When the external terminals 155 and 156 are short-circuited, electric current flows between the source and drain of the N-ch discharge control FET 609 and between the source and drain of the N-ch charge control FET 610, and the on-resistances of the N-ch discharge control FET 609 and the N-ch charge control FET 610 make the voltage at the non-inverting input terminal of the comparator 621 rise. When the voltage at the non-inverting input terminal of the comparator 621 exceeds the voltage on the reference voltage circuit 622, the comparator 621 outputs Hi signal. As a result, the N-ch FET 603 is turned on to make electric current flow from the constant current circuit 601, and voltage generated by the on-resistances of the N-ch FETs 602 and 603 is output to the inverting input terminal of the comparator 604. The electric current continues to flow between the source and drain of the N-ch discharge control FET 609 and between the source and drain of the N-ch charge control FET 610, and when the voltage at the non-inverting input terminal of the comparator 604 exceeds the voltage at its inverting input terminal, the comparator 604 outputs Hi signal. As a result, Lo signal is output to the gate of the N-ch discharge control FET 609 through the discharge control circuit 607 to turn off the N-ch discharge control FET 609. Thus, when the external terminals 155 and 156 are short-circuited, overcurrent protection can be imposed.

The voltage on the reference voltage circuit 622 is set lower than the voltage at the inverting input terminal of the comparator 604 generated when a set current flows to impose overcurrent protection. Thus, the N-ch FET 603 is turned on before reaching the set current for imposing overcurrent protection, enabling overcurrent protection at the time of the set current. Further, since the N-ch FET 603 is turned off until reaching the set current, the consumption current without overcurrent protection can be reduced.

The on-resistance Ron 610 of the N-ch charge control FET 610, the on-resistance Ron 609 of the N-ch discharge control FET 609, and the on-resistances Ron 602 and Ron 603 of the N-ch FETs 602 and 603 are set to satisfy the following: (Ron 609+Ron 610)÷(Ron 602+Ron 603)=M (constant). If the overcurrent detection current is denoted as Ioc and the current in the constant current circuit 601 is denoted as Iref, it is set to satisfy the following: Iref=Ioc×(Ron 609+Ron 610)÷(Ron 602+Ron 603). Ioc can be set by adjusting the current value of Iref and the temperature characteristics, the on-resistances of the N-ch FETs 602, 603 and the temperature characteristics, and the gate-source voltage characteristics. For example, FETs having temperature characteristics and gate-source voltage characteristics similar to those of the N-ch discharge control FET 609 and the N-ch charge control FET 610 have just to be used for the N-ch FETs 602 and 603.

Though not shown, the operation of the comparator 604 is switched on/off using the output signal of the comparator 621, enabling further reduction in consumption current. Further, the output of the comparator 621 may be connected to the gate of the N-ch FET 603 through an inverter or the like to perform control.

In addition, the source and drain of the N-ch FET 602 can be wired to operate in the same way even if the N-ch FET is eliminated.

As described above, according to the battery assembly including the overcurrent protecting circuit of the seventh embodiment, the N-ch FET 603 is turned off when overcurrent protection is not imposed, enabling reduction in consumption current.

Eighth Embodiment

Figure 8:
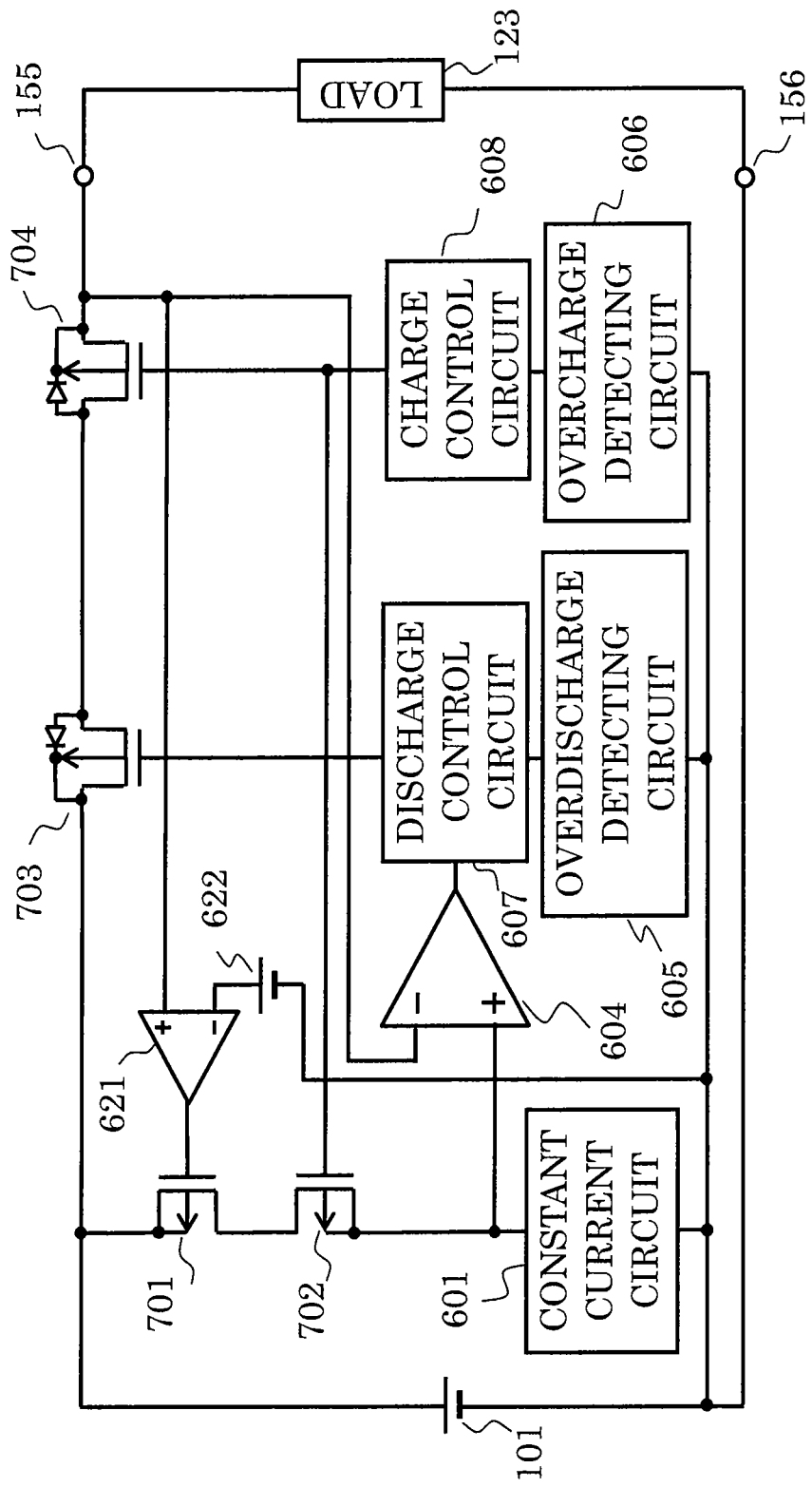
FIG. 8 is a block diagram of a battery assembly including an overcurrent protecting circuit of an eighth embodiment.
Figure 9:
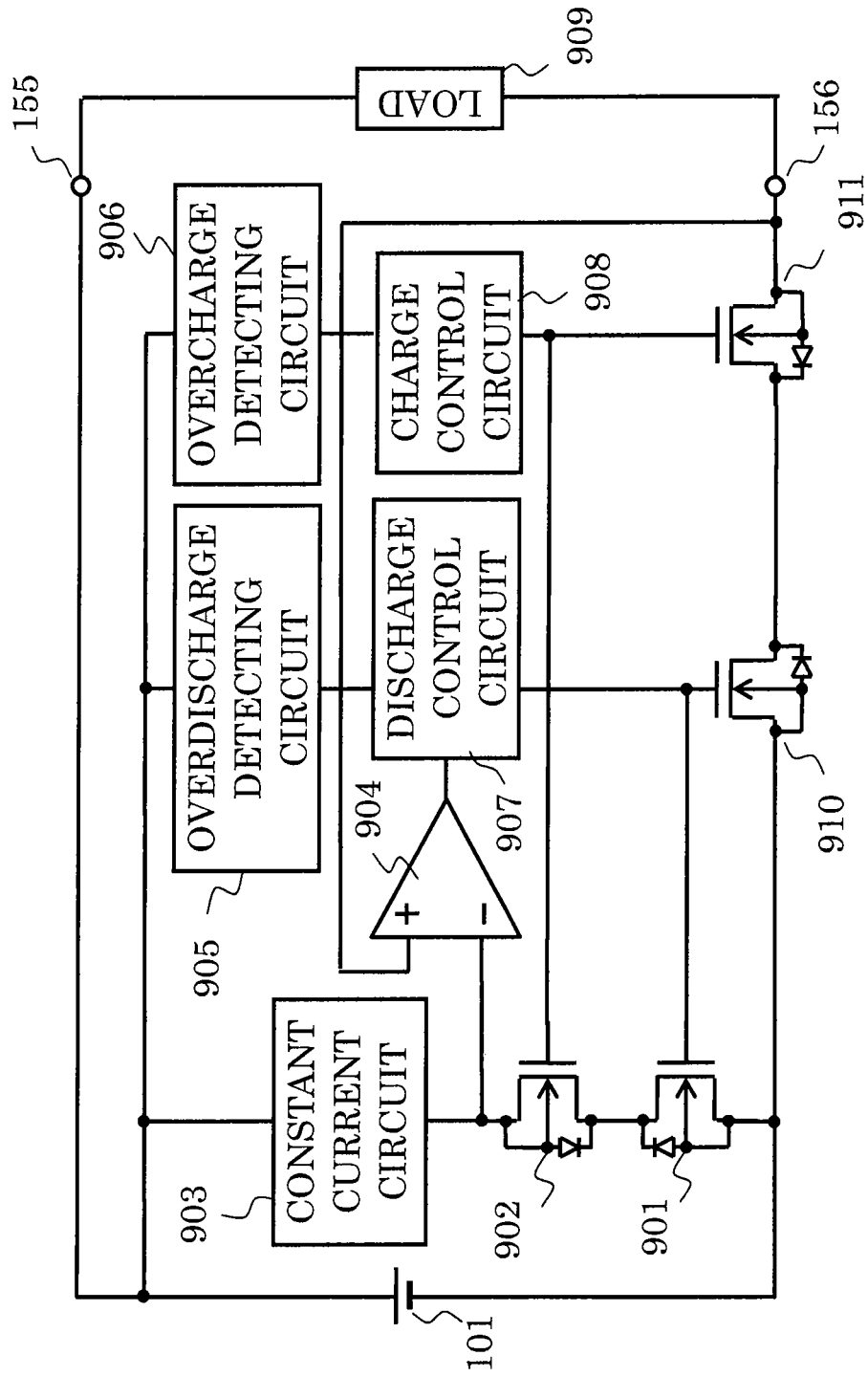
FIG. 9 is a block diagram of a battery assembly including a conventional overcurrent protecting circuit.

FIG. 8 is a block diagram of a battery assembly including an overcurrent protecting circuit of an eighth embodiment.

Points different from FIG. 7 are that the N-ch FETs 602 and 603 are replaced by P-ch FETs 701 and 702, and the N-ch discharge control FET 609 and the N-ch charge control FET 610 are replaced by a P-ch discharge control FET 703 and a P-ch charge control FET 704.

The negative electrode of the secondary battery 101 is connected to the constant current circuit 601, the overdischarge detecting circuit 605, the overcharge detecting circuit 606, and the external terminal 156, and the positive electrode is connected to the source and back gate of the P-ch FET 701 and the source and back gate of the P-ch discharge control FET 703. The other terminal of the constant current circuit 601 is connected to the source and back gate of the P-ch FET 702, the other terminal of the overdischarge detecting circuit 605 is connected to the discharge control circuit 607, and the other terminal of the overcharge detecting circuit 606 is connected to the charge control circuit 608. The non-inverting input terminal of the comparator 604 is connected to the source and back gate of the P-ch FET 702, the inverting input terminal is connected to the external terminal 155, and the output terminal is connected to the discharge control circuit 607. The gate of the P-ch FET 702 is connected to the charge control circuit 608 and the gate of the P-ch charge control FET 704, and the drain is connected to the drain of the P-ch FET 701. The inverting input terminal of the comparator 621 is connected to the reference voltage circuit 622, the non-inverting input terminal is connected to the external terminal 155 and the source and back gate of the P-ch charge control FET 704, and the output terminal is connected to the gate of the P-ch FET 701. The other terminal of the reference voltage circuit 622 is connected to the negative electrode of the secondary battery 101. The gate of the P-ch discharge control FET 703 is connected to the discharge control circuit 607, and the drain is connected to the drain of the P-ch charge control FET 704.

Next, the operation of the battery assembly including the overcurrent protecting circuit of the eighth embodiment will be described. When the external terminals 155 and 156 are short-circuited, electric current flows between the source and drain of the P-ch discharge control FET 703 and between the source and drain of the P-ch charge control FET 704, and the on-resistances of the P-ch discharge control FET 703 and the P-ch charge control FET 704 make the voltage at the non-inverting input terminal of the comparator 621 drop. When the voltage at the non-inverting input terminal of the comparator 621 falls below the voltage on the reference voltage circuit 622, the comparator 621 outputs Lo signal. As a result, the P-ch FET 701 is turned on to make electric current flow into the constant current circuit 601, and voltage generated by the on-resistances of the P-ch FETs 702 and 701 is output to the non-inverting input terminal of the comparator 604. The electric current continues to flow between the source and drain of the P-ch discharge control FET 703 and between the source and drain of the P-ch charge control FET 704, and when the voltage at the inverting input terminal of the comparator 604 falls below the voltage at its non-inverting input terminal, the comparator 604 outputs Hi signal. As a result, Hi signal is output to the gate of the P-ch discharge control FET 703 through the discharge control circuit 607 to turn off the P-ch discharge control FET 703. Thus, when the external terminals 155 and 156 are short-circuited, overcurrent protection can be imposed.

The voltage on the reference voltage circuit 622 is set higher than the voltage at the non-inverting input terminal of the comparator 604 generated when a set current flows to impose overcurrent protection. Thus, the P-ch FET 701 is turned on before reaching the set current for imposing overcurrent protection, enabling overcurrent protection. Further, since the P-ch FET 701 is turned off until reaching the set current, the consumption current without overcurrent protection can be reduced.

The on-resistance Ron 704 of the P-ch charge control FET 704, the on-resistance Ron 703 of the P-ch discharge control FET 703, and the on-resistances Ron 701 and Ron 702 of the P-ch FETs 701 and 702 are set to satisfy the following: (Ron 703+Ron 704)÷(Ron 701+Ron 702)=M (constant). If the overcurrent detection current is denoted as Ioc and the current in the constant current circuit 601 is denoted as Iref, it is set to satisfy the following: Iref=Ioc×(Ron 703+Ron 704)÷(Ron 701+Ron 702). Ioc can be set by adjusting the current value of Iref and the temperature characteristics, the on-resistances of the P-ch FETs 702, 701 and the temperature characteristics, and the gate-source voltage characteristics. For example, FETs having temperature characteristics and gate-source voltage characteristics similar to those of the P-ch discharge control FET 703 and the P-ch charge control FET 704 have just to be used for the P-ch FETs 702 and 701.

Though not shown, the operation of the comparator 604 is switched on/off using the output signal of the comparator 621, enabling further reduction in consumption current. Further, the output of the comparator 621 may be connected to the gate of the P-ch FET 701 through an inverter or the like.

In addition, the source and drain of the P-ch FET 702 can be wired to operate in the same way even if the P-ch FET is eliminated.

As described above, according to the battery assembly including the overcurrent protecting circuit of the eighth embodiment, the P-ch FET 701 is turned off when overcurrent protection is not imposed, enabling reduction in consumption current.

Ninth Embodiment

Figure 10:
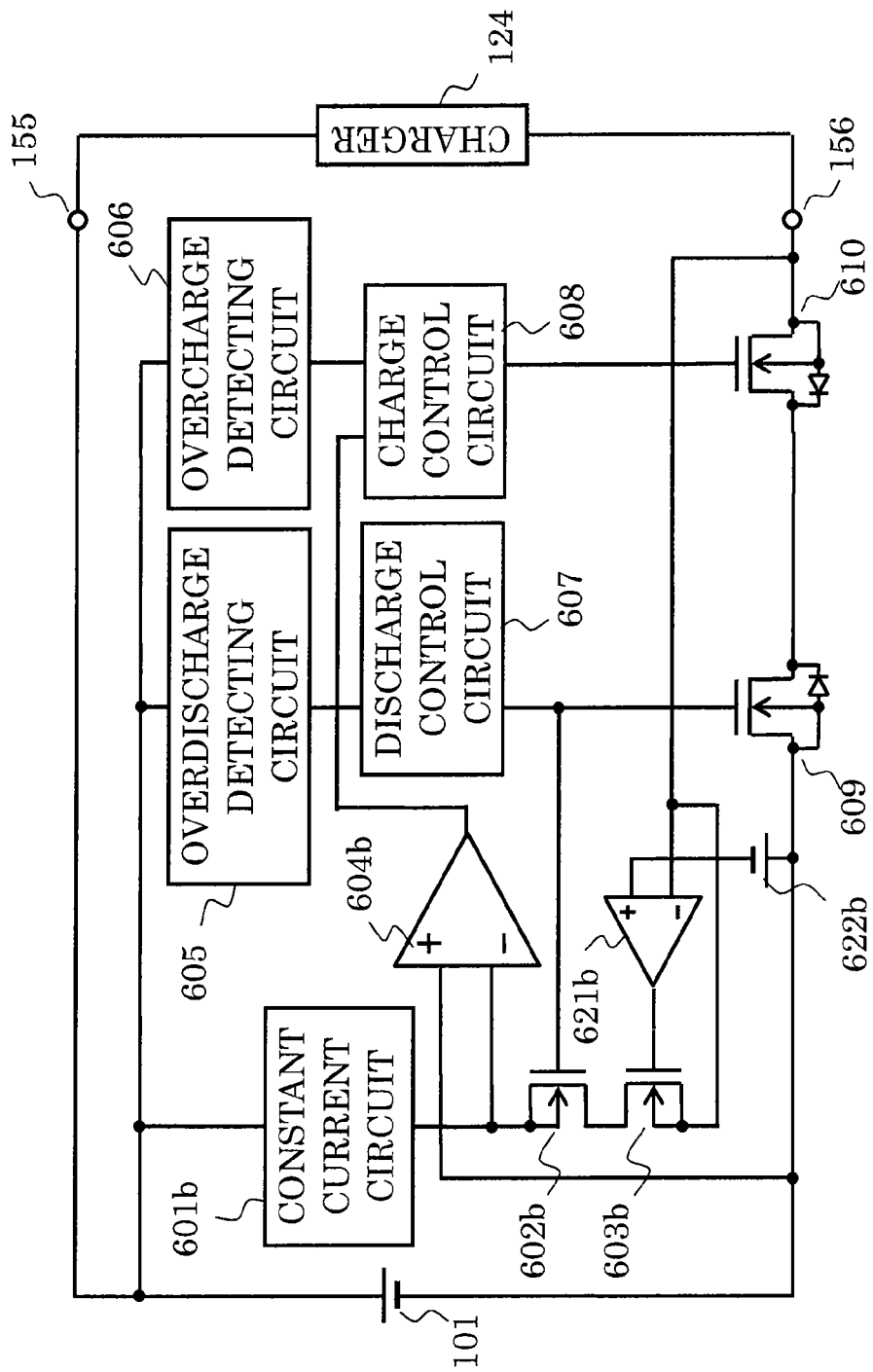
FIG. 10 is a block diagram of a battery assembly including an overcurrent protecting circuit of a ninth embodiment.

FIG. 10 is a block diagram of a battery assembly including an overcurrent protecting circuit of a ninth embodiment.

The battery assembly of the ninth embodiment is illustrated as an example of a charge overcurrent protecting circuit in contrast to the discharge overcurrent protecting circuit of the seventh embodiment.

The battery assembly of the ninth embodiment includes a secondary battery 101, a constant current circuit 601b, N-ch FETs 602b and 603b, comparators 604b and 621b, an overdischarge detecting circuit 605, an overcharge detecting circuit 606, a discharge control circuit 607, a charge control circuit 608, an N-ch discharge control FET 609, an N-ch charge control FET 610, a reference voltage circuit 622b, and external terminals 155 and 156.

The positive electrode of the secondary battery 101 is connected to the constant current circuit 601b, the overdischarge detecting circuit 605, the overcharge detecting circuit 606, and the external terminal 155, and the negative electrode is connected to the source and back gate of the N-ch discharge control FET 609. The drain of the N-ch charge control FET 610 is connected to the drain of the N-ch discharge control FET 609, and the source and back gate are connected to the external terminal 156. The other terminal of the constant current circuit 601b is connected to the source and back gate of the N-ch FET 602b. The other terminal of the overdischarge detecting circuit 605 is connected to the discharge control circuit 607. The other terminal of the overcharge detecting circuit 606 is connected to the charge control circuit 608. The drain of the N-ch FET 603b is connected to the drain of the N-ch FET 602b, and the source and back gate is connected to the external terminal 156. The other terminal of the discharge control circuit 607 is connected to the gate of the N-ch discharge control FET 609 and the gate of the N-ch FET 602b. The other terminal of the charge control circuit 608 is connected to the gate of the N-ch charge control FET 610. The inverting input terminal of the comparator 604b is connected to the source and back gate of the N-ch FET 602b, the non-inverting input terminal is connected to the source and back gate of the N-ch discharge control FET 609, and the output terminal is connected to the charge control circuit 608. The inverting input terminal of the comparator 621b is connected to the external terminal 156, the non-inverting input terminal is connected to the reference voltage circuit 622b, and the output terminal is connected to the gate of the N-ch FET 603b. The other terminal of the reference voltage circuit 622b is connected to the source and back gate of the N-ch discharge control FET 609.

The battery assembly of the ninth embodiment constructed as mentioned above can include a charge overcurrent protecting circuit with low consumption current characteristics in the same manner as the discharge overcurrent protecting circuit of the seventh embodiment.

Tenth Embodiment

Figure 11:
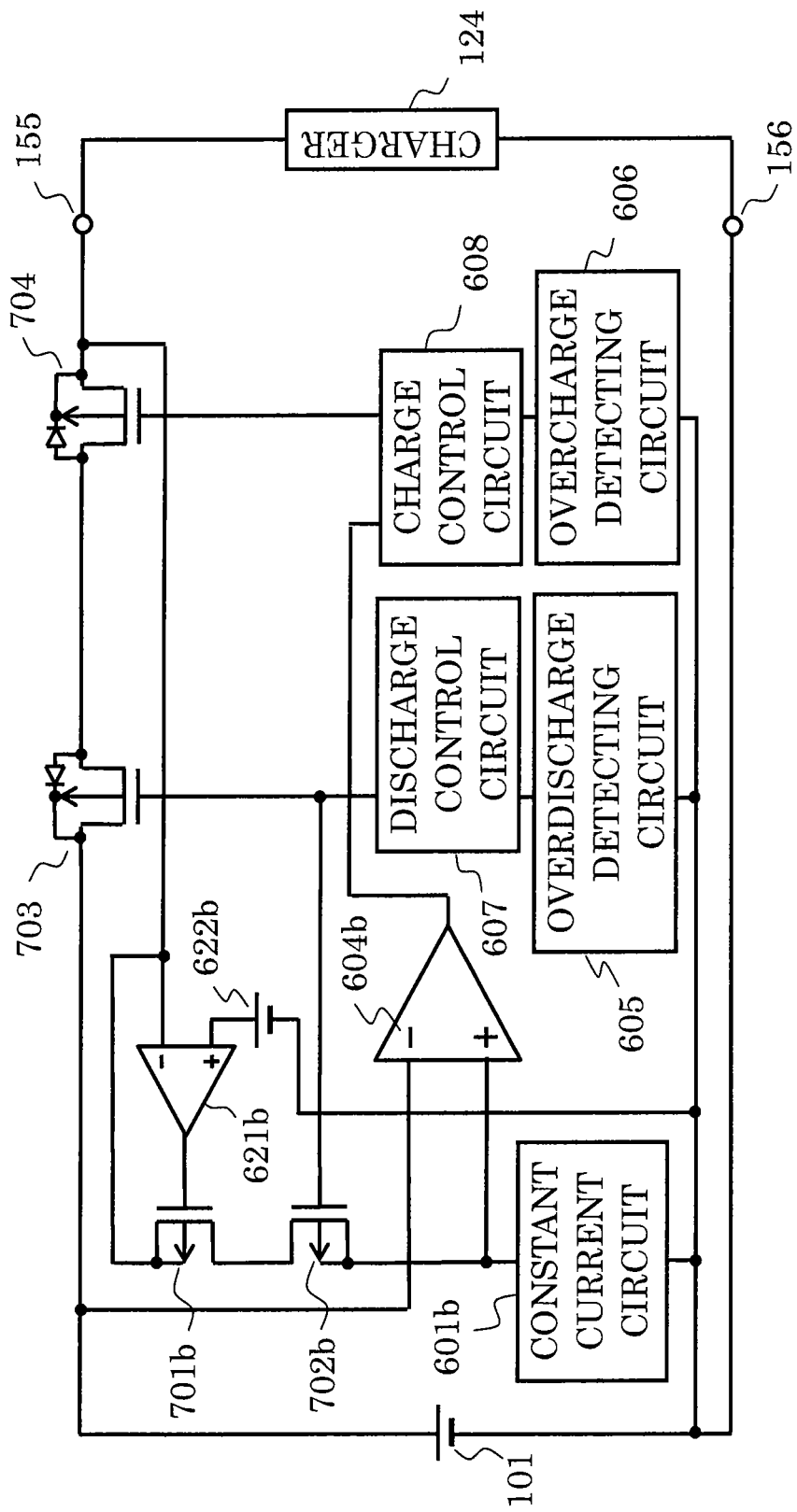
FIG. 11 is a block diagram of a battery assembly including an overcurrent protecting circuit of a tenth embodiment.

FIG. 11 is a block diagram of a battery assembly including an overcurrent protecting circuit of a tenth embodiment.

The battery assembly of the tenth embodiment is illustrated as an example of a charge overcurrent protecting circuit in contrast to the discharge overcurrent protecting circuit of the eighth embodiment.

The battery assembly of the tenth embodiment includes a secondary battery 101, a constant current circuit 601b, P-ch FETs 701b and 702b, comparators 604b and 621b, an overdischarge detecting circuit 605, an overcharge detecting circuit 606, a discharge control circuit 607, a charge control circuit 608, a P-ch discharge control FET 703, a P-ch charge control FET 704, a reference voltage circuit 622b, and external terminals 155 and 156.

The positive electrode of the secondary battery 101 is connected to the source and back gate of the P-ch discharge control FET 703, and the negative electrode is connected to the constant current circuit 601b, the overdischarge detecting circuit 605, the overcharge detecting circuit 606, and the external terminal 156. The drain of the P-ch charge control FET 704 is connected to the drain of the P-ch discharge control FET 703, and the source and back gate are connected to the external terminal 155. The other terminal of the constant current circuit 601b is connected to the source and back gate of the P-ch FET 702b. The other terminal of the overdischarge detecting circuit 605 is connected to the discharge control circuit 607. The other terminal of the overcharge detecting circuit 606 is connected to the charge control circuit 608. The drain of the P-ch FET 701b is connected to the drain of the P-ch FET 702b, and the source and back gate are connected to the external terminal 155. The other terminal of the discharge control circuit 607 is connected to the gate of the P-ch discharge control FET 703 and the gate of the P-ch FET 702b. The other terminal of the charge control circuit 608 is connected to the gate of the P-ch charge control FET 704. The non-inverting input terminal of the comparator 604b is connected to the source and back gate of the P-ch FET 702b, the inverting input terminal is connected to the source and back gate of the P-ch discharge control FET 703, and the output terminal is connected to the charge control circuit 608. The inverting input terminal of the comparator 621b is connected to the external terminal 155, the non-inverting input terminal is connected to the reference voltage circuit 622b, and the output terminal is connected to the gate of the P-ch FET 701b. The other terminal of the reference voltage circuit 622b is connected to the negative electrode of the secondary battery 101.

The battery assembly of the tenth embodiment constructed as mentioned above can include a charge overcurrent protecting circuit with low consumption current characteristics in the same manner as the discharge overcurrent protecting circuit of the eighth embodiment.

As described above, according to the present invention, there can be provided a charge/discharge control circuit and a battery assembly including an accurate overcurrent protecting circuit with low consumption current characteristics.

The first to eighth embodiments illustrate examples of overcurrent protecting circuits for discharge overcurrent, and the ninth and tenth embodiments illustrate examples of overcurrent protecting circuits for charge overcurrent, but the present invention may include both protecting circuits.

What is claimed is:

1. A charge/discharge control circuit for controlling a control transistor in a current path between a secondary battery and a load or a charger to control charge/discharge of the secondary battery, the charge/discharge control circuit comprising:
an overcurrent protecting circuit including,
a first comparison circuit for comparing voltage, generated by electric current flowing through the control transistor, with a first reference voltage,
a second reference voltage circuit for outputting a second reference voltage, wherein an on and off state of the second reference voltage circuit is controlled by output of the first comparison circuit, and the second reference voltage circuit includes a normally-off reference transistor having a gate electrode coupled to an output of the first comparison circuit and a drain connected to a constant current circuit that feeds electric current to the normally-off reference transistor,
wherein the normally-off reference transistor is equivalent in temperature and gate-source voltage characteristics to the control transistor, and
a second comparison circuit for comparing voltage, generated by the electric current flowing through the control transistor, with the second reference voltage,
wherein the first reference voltage is lower than the second reference voltage, and when overcurrent flows through the control transistor, the normally-off reference transistor is first turned on by the output of the first comparison circuit, and when the electric current is further increased, the control transistor is turned off.

2. The charge/discharge control circuit according to claim 1, wherein the overcurrent protecting circuit comprises one or both of a discharge overcurrent protecting circuit for detecting discharge overcurrent flowing through the control transistor, or a charge overcurrent protecting circuit for detecting charge overcurrent flowing through the control transistor.

3. A battery assembly comprising:
a secondary battery capable of being charged and discharged;
the control transistor of claim 1 in a charge and discharge path of the secondary battery to control charge and discharge of the secondary battery; and
the charge/discharge control circuit according to claim 1, which controls the control transistor to control the charge and discharge of the secondary battery.

4. A battery assembly comprising:
a secondary battery capable of being charged and discharged;

the control transistor of claim 1 in a charge and discharge path of the secondary battery to control charge and discharge of the secondary battery; and the charge/discharge control circuit according to claim 2, which controls the control transistor to control the charge and discharge of the secondary battery.

* * * * *